(12) United States Patent
Chang

(10) Patent No.: US 11,379,244 B2
(45) Date of Patent: Jul. 5, 2022

(54) METHOD AND SYSTEM FOR CONTROLLING SYSTEM BOOT

(71) Applicant: Quanta Computer Inc., Taoyuan (TW)

(72) Inventor: Tien-Jung Chang, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 0 days.

(21) Appl. No.: 17/086,121

(22) Filed: Oct. 30, 2020

(65) Prior Publication Data

US 2022/0137979 A1     May 5, 2022

(51) Int. Cl.
G06F 9/00      (2006.01)
G06F 15/177    (2006.01)
G06F 9/4401    (2018.01)

(52) U.S. Cl.
CPC .................. *G06F 9/4401* (2013.01)

(58) Field of Classification Search
CPC ..................................................... G06F 9/4401
See application file for complete search history.

(56) References Cited

U.S. PATENT DOCUMENTS

| 5,687,379 A * | 11/1997 | Smith ..................... G06F 21/82 710/262 |
| 6,145,085 A * | 11/2000 | Tran ........................ G06F 21/31 726/5 |
| 6,718,461 B1 * | 4/2004 | Ewertz .................. G06F 9/4401 710/10 |
| 2008/0178281 A1 * | 7/2008 | Narayanaswami ... G06F 21/575 726/17 |
| 2014/0201514 A1 * | 7/2014 | Chao ..................... G06F 9/4418 713/2 |
| 2016/0314002 A1 * | 10/2016 | Khatri ................... G06F 9/4403 |
| 2018/0032761 A1 * | 2/2018 | Subramanian .......... G06F 21/86 |
| 2018/0293390 A1 * | 10/2018 | Baker ................. G06F 21/6218 |
| 2019/0310862 A1 * | 10/2019 | Mortensen ............ G06F 9/4401 |

* cited by examiner

*Primary Examiner* — Mohammed H Rehman
(74) *Attorney, Agent, or Firm* — Nixon Peabody LLP

(57) ABSTRACT

A method and computer system are disclosed for controlling a system boot of the computer system. Both involve determining that a chassis of the computer system was opened, determining whether the opening of the chassis was authorized, and controlling the system boot of the computer system based on whether the opening of the chassis was authorized.

18 Claims, 2 Drawing Sheets

METHOD AND SYSTEM FOR CONTROLLING SYSTEM BOOT

FIELD OF THE INVENTION

The present invention relates to computer system security, and specifically to controlling the system boot of a computer system.

BACKGROUND

Security has always been important for computer systems, and particularly for server computer systems. Although a large portion of security is focused on authorized electronic intrusions from a remote system, unauthorized intrusions into the computer system from a local bad actor are still an important aspect of security. A complete security perspective needs to protect against local attacks to the hardware of a computer system, such as from a hacker opening a computer system to make unauthorized changes to the computer system.

Accordingly, there is a need for controlling a system boot of a computer system based on unauthorized access to the computer system. Aspects of the present disclosure solve this and other problems.

SUMMARY

According to one embodiment, a method is disclosed for controlling a system boot of a computer system. The method includes determining that a chassis of the computer system was opened. The method further includes determining whether the opening of the chassis was authorized. The method further includes controlling the system boot of the computer system based on whether the opening of the chassis was authorized.

An aspect of the method includes the system boot of the computer system being prohibited responsive to the opening of the chassis being unauthorized. An aspect of the method includes the system boot of the computer system being allowed responsive to the opening of the chassis being authorized. An aspect of the method includes the opening of the chassis including removing a top cover of the chassis. The aspect further includes the removing of the top cover operating a switch that indicates that the chassis was opened. An aspect of the method includes requiring a mechanical unlocking of the chassis with a mechanical key for the opening of the chassis to be authorized. An aspect of the method includes the mechanical unlocking of the chassis being authorized based, at least in part, on timing of the opening of the chassis being within a predetermined time period. An aspect of the method includes requiring an electronic unlocking of the chassis for the opening of the chassis to be authorized. An aspect of the method includes the electronic unlocking of the chassis being authorized based, at least in part, on timing of the opening of the chassis being within a predetermined time period. An aspect of the method includes the determination of whether the opening was authorized including determining whether a key event occurred. An aspect of the method includes the key event occurring, thus resulting in the opening of the chassis being authorized. An aspect of the method includes the key event not occurring, thus resulting in the opening of the chassis being unauthorized. An aspect of the method includes the key event being a mechanical indication, an electronic indication, or both. An aspect of the method includes logging that the chassis was opened and causing, at least in part, the determination of whether the opening of the chassis was authorized upon initialization of the system boot.

According to one embodiment, a computer system is disclosed. The computer system includes a memory storing machine-readable instructions and one or more processors. The one or more processors are configured to execute the machine-readable instructions to determine that a chassis of the computer system was opened. The one or more processors are configured to execute the machine-readable instructions further to determine whether the opening of the chassis was authorized. The one or more processors are configured to execute the machine-readable instructions further to control the system boot of the computer system based on whether the opening of the chassis was authorized.

An aspect of the computer system further includes the one or more processors being configured to execute the machine-readable instructions to require a mechanical unlocking of the chassis with a mechanical key for the opening of the chassis to be authorized. An aspect of the computer system further includes the one or more processors being configured to execute the machine-readable instructions to require an electronic unlocking of the chassis for the opening of the chassis to be authorized. An aspect of the computer system further includes the one or more processors being configured to execute the machine-readable instructions to log that the chassis was opened and cause, at least in part, the determination of whether the opening of the chassis was authorized upon initialization of the system boot. Aspects of the computer system further include the opening of the chassis operating a switch that indicates that the chassis was opened. Aspects of the computer system further include the determination of whether the opening was authorized, including determining whether a key event occurred.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure, and its advantages and drawings, will be better understood from the following description of embodiments together with reference to the accompanying drawings. These drawings depict only embodiments and are, therefore, not to be considered as limitations on the scope of the various embodiments or claims.

DETAILED DESCRIPTION

Figure 1:
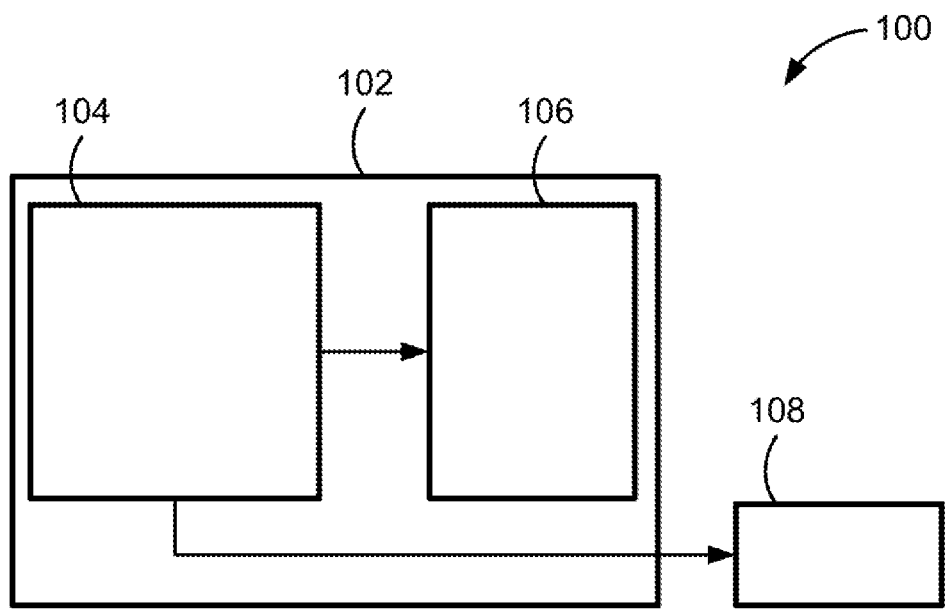
FIG. 1 is a partial system diagram of a computer system, according to aspects of the present disclosure.

The various embodiments are described with reference to the attached figures, where like reference numerals are used throughout the figures to designate similar or equivalent elements. The figures are not drawn to scale, and they are provided merely to illustrate the instant invention. It should be understood that numerous specific details, relationships, and methods are set forth to provide a full understanding. One having ordinary skill in the relevant art, however, will readily recognize that the various embodiments can be practiced without one or more of the specific details, or with other methods. In other instances, well-known structures or operations are not shown in detail to avoid obscuring certain aspects of the various embodiments. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Referring to FIG. 1, a partial system diagram of a computer system 100 is shown, according to aspects of the present disclosure. The computer system 100 can be a server computer system. Alternatively, the computer system 100 can be any computer system such as a desktop, a laptop, or a personal computer and the like.

The computer system 100 includes a computer board 102, such as a motherboard, a daughter board, etc. On the computer board 102 is a security controller 104. The security controller 104 can be any one or more types of one or more processors that perform the functionality described herein for controlling the system boot of the computer system 100. In one or more embodiments, the security controller 104 can perform the functionality based on the execution of software, firmware, and/or hardware. In one or more embodiments, the security controller 104 can be the central processing unit (CPU), a microprocessor, an application-specific integrated circuit (ASIC), or any other processor and/or controller that is configured to perform the disclosed functionality.

The computer board 102 also includes a baseboard management controller (BMC) 106. However, in one or more embodiments, the security controller 104 and the BMC 106 can be the same component. For example, the functionality described herein as being performed by the security controller 104 can instead be performed by the BMC 106, and the computer board 102 can lack a separate security controller 104. Alternatively, in one or more embodiments, the security controller 104 and the BMC 106 can be the same component, and any functionality described performed by the BMC 106 can instead be performed by the security controller 104. In which case, the computer board 102 can lack a separate BMC 106.

The computer system 100 further includes a switch 108. The switch 108 is configured to indicate that a chassis (FIG. 2) of the computer system 100 was opened. As discussed further with respect to FIG. 2 below, internal components of the computer system 100 can be accessed when the chassis (FIG. 2) is opened. Thus, the presence of the switch 108 indicates when the chassis (FIG. 2) was opened. The security controller 104, the BMC 106, and the switch 108 function together to prohibit a system boot of the computer system 100 when there has been an unauthorized access (e.g., opening) of the computer system 100, as further discussed below with respect to FIG. 3.

Figure 2:
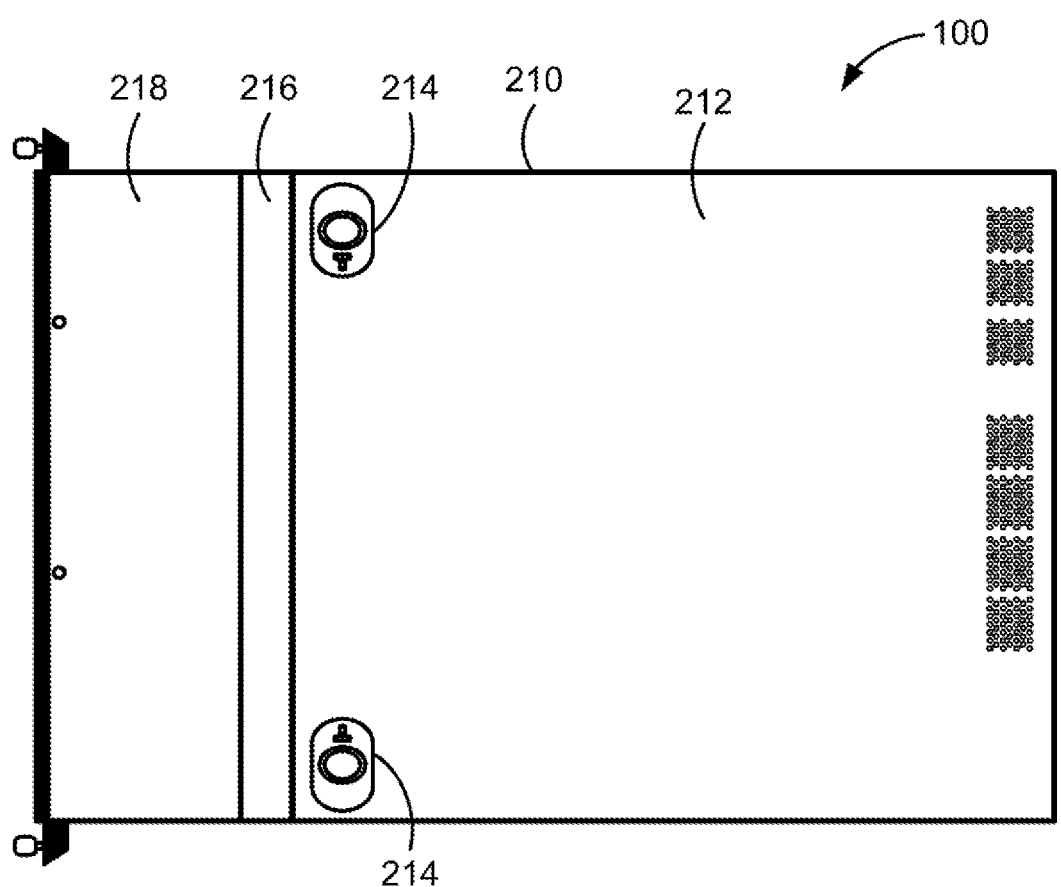
FIG. 2 is a top view of a chassis of a computer system, according to aspects of the present disclosure.

Referring to FIG. 2, a top view of a chassis 210 of the computer system 100 is shown, according to aspects of the present disclosure. The chassis 210 houses the components disclosed above with respect to FIG. 1. The chassis 210 includes a top cover 212 that can be removed. When the top cover 212 is removed from the chassis 210, a user can access the internal components of the chassis 210. For example, an unauthorized user (e.g., a hacker) can gain access to the internal components of the computer system 100 to make unauthorized changes. The chassis 210 with the top cover 212, in combination with the elements of the computer system 100, can limit or prevent a system boot from occurring after such unauthorized access. Preventing a system boot can prevent or limit nefarious actions of the unauthorized user from occurring. Although disclosed throughout as being the top cover, the top cover 212 can alternatively be any panel that, when removed, provides access to the inside of the chassis 210.

The top cover 212 includes two latches 214. However, the top cover 212 can alternatively include one or more than two latches 214. The latches 214 are mechanical devices that resist the top cover 212 from being removed from the chassis 210, which provides access to the internal components (not shown) of the computer system 100, unless the latches 214 are mechanically operated. In one or more embodiments, one or both of the latches 214 can constitute the switch 108 of FIG. 1. For example, mechanical operation of the latch 214 to remove the top cover 212 can provide a signal to the security controller 104 that indicates access was provided to the inside of the chassis 210. Alternatively, the switch 108 can be a separate element from the latches 214, such as a short circuit that bridges a gap 216 between the top cover 212 and a fixed panel 218 of the chassis 210. In which case, breaking the circuit by removing the top cover 212 opens the switch 108 and indicates that the top cover 212 has been removed.

In one or more embodiments, one or both of the latches 214 can be locked, or there can be a separate lock (not shown) that prevents or logs unauthorized removal of the top cover 212. In one or more embodiments, the lock can be mechanical such that the lock must be operated mechanically (e.g., with a key, a combination of drums, etc.) to unlock the lock and allow the latches 214 to open and/or the top cover 212 to be removed. In one or more embodiments, the lock can be electronic such that the lock must be operated electronically (e.g., wireless signal, correct number sequence or code on a panel, etc.) to unlock the lock and allow the latches 214 to open and/or the top cover 212 to be removed.

Figure 3:
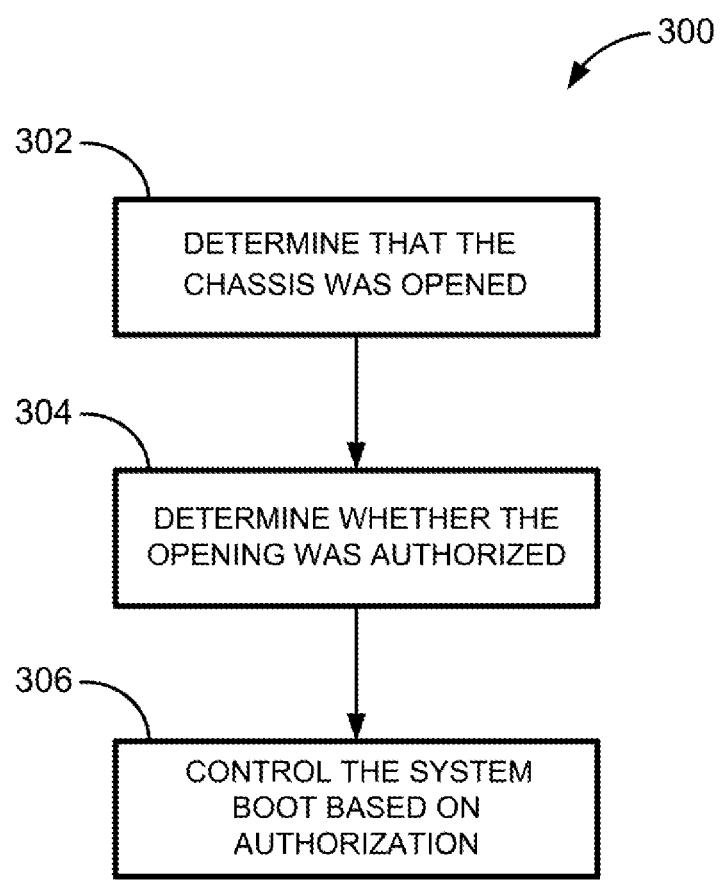
FIG. 3 is a flowchart illustrating a method for controlling a system boot of a computer system, according to aspects of the present disclosure.

FIG. 3 is a flowchart illustrating a method for controlling a system boot of a computer system, according to aspects of the present disclosure. As discussed above, the method can be performed by the security controller 104 within a computer system, or the BMC 106 if it embodies and performs the functionality of the security controller 104. The method 300 begins with step 302, where the security controller determines that a chassis of a computer system was opened. The security controller can determine that the chassis is opened by the activation or deactivation of a switch on the chassis. As discussed above, the switch can be a separate switch or can be integrated into a latch that is used to release a component of the chassis for gaining access to inside of the chassis. For example, in one or more embodiments, the opening of the chassis includes removing a top cover of the chassis. Removal of the top cover can activate the switch.

In one or more embodiments, activation (or deactivation) of the switch is logged into a database to record that the chassis was opened. The record can be reviewed later by a user to see when the chassis was opened in the past. This can be used for manual verification of when a user gained access to inside the computer system.

At step 304, the security controller determines whether the opening of the chassis was authorized. For example, the result of the determination that the chassis was opened can cause a determination of whether the opening of the chassis was authorized. This can occur as part of the initialization of the system boot of the computer system but prior to the system boot, in order to prevent any type of malicious activity from an unauthorized access of the computer system from affecting the computer system.

In one or more embodiments, the opening of the chassis was authorized when completed with a mechanical unlocking of the chassis with a mechanical key. For example, an authorized user can insert a mechanical key into a lock on the chassis. Operation of the mechanical key enables access to inside the computer system, which can deactivate the switch that would otherwise indicate an unauthorized access into the computer system. Because the switch is not activated, there is no indication of an unauthorized access into the computer system. Thus, the system boot can proceed as normal upon start of the computer system. In one or more embodiments, the opening of the chassis was authorized when completed with an electronic unlocking of the chassis. For example, an authorized user can enter an electronic code, which can deactivate the switch that would otherwise indicate an unauthorized access into the computer system. Because the switch is not activated, there is no indication of an unauthorized access into the computer system.

In one or more embodiments, the determination of whether the opening was authorized includes determining whether a key event occurred. The key event occurring results in the opening of the chassis being authorized. Conversely, the key event not occurring results in the opening of the chassis being unauthorized. The key event can be a mechanical indication and/or an electronic indication that access into the chassis was authorized, but the key event can be separate from any type of unlocking of the chassis. For example, access into the chassis may not require unlocking a lock. Yet, access into the chassis to indicate that the access was authorized may require a key event, such as the mechanical and/or electronic indication.

In one or more embodiments, the electronic unlocking of the chassis, the mechanical unlocking of the chassis, and/or a key event can be authorized based, at least in part, on timing of the opening of the chassis being within a predetermined time period. For example, authorized access into the chassis can occur during only a predetermined time period during the day. Outside of the predetermined time period, the access into the chassis is unauthorized regardless of whether the access is associated with an otherwise authorized mechanical and/or electronic unlocking of the chassis and/or an authorized key event.

At step 306, the security controller controls the system boot of the computer system based on whether the opening of the chassis was authorized. The system boot of the computer system is prohibited responsive to the opening of the chassis being unauthorized. Conversely, the system boot of the computer system is allowed responsive to the opening of the chassis being authorized. Based on the control over the system boot upon the detection of access into the computer system, acts by an authorized party intended to harm the computer system upon the system boot occurring can be limited or prevented. This improves the security of the computer system by limiting or preventing the effects of unauthorized access.

While various embodiments of the present invention have been described above, it should be understood that they have been presented by way of example only, and not limitation. Numerous changes to the disclosed embodiments can be made in accordance with the disclosure herein without departing from the spirit or scope. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for controlling a system boot of a computer system, the method comprising:
   determining that a chassis of the computer system was opened;
   determining whether the opening of the chassis was authorized; and
   controlling the system boot of the computer system based on whether the opening of the chassis was authorized,
   wherein the system boot of the computer system is prohibited responsive to the opening of the chassis being unauthorized and the system boot of the computer system is allowed responsive to the opening of the chassis being authorized.

2. The method of claim 1, wherein the opening of the chassis includes removing a top cover of the chassis.

3. The method of claim 2, wherein the removing the top cover operates a switch that indicates that the chassis was opened.

4. The method of claim 1, further comprising requiring a mechanical unlocking of the chassis with a mechanical key for the opening of the chassis to be authorized.

5. The method of claim 4, wherein the mechanical unlocking of the chassis was authorized based, at least in part, on timing of the opening of the chassis being within a predetermined time period.

6. The method of claim 1, further comprising requiring an electronic unlocking of the chassis for the opening of the chassis to be authorized.

7. The method of claim 6, wherein the electronic unlocking of the chassis was authorized based, at least in part, on timing of the opening of the chassis being within a predetermined time period.

8. The method of claim 1, wherein the determining whether the opening was authorized includes determining whether a key event occurred.

9. The method of claim 8, wherein the key event occurring results in the opening of the chassis being authorized.

10. The method of claim 8, wherein the key event not occurring results in the opening of the chassis being unauthorized.

11. The method of claim 8, wherein the key event is a mechanical indication, an electronic indication, or both.

12. The method of claim 1, further comprising:
logging that the chassis was opened; and
causing, at least in part, the determining whether the opening of the chassis was authorized upon initialization of the system boot.

13. A computer system comprising:
a memory storing machine-readable instructions; and
one or more processors configured to execute the machine-readable instructions to:
determine that a chassis of the computer system was opened;
determine whether the opening of the chassis was authorized; and
control the system boot of the computer system based on whether the opening of the chassis was authorized,
wherein the system boot of the computer system is prohibited responsive to the opening of the chassis being unauthorized and the system boot of the computer system is allowed responsive to the opening of the chassis being authorized.

14. The computer system of claim 13, wherein the one or more processors are configured to execute the machine-readable instructions further to require a mechanical unlocking of the chassis with a mechanical key for the opening of the chassis to be authorized.

15. The computer system of claim 13, wherein the one or more processors are configured to execute the machine-readable instructions further to require an electronic unlocking of the chassis for the opening of the chassis to be authorized.

16. The computer system of claim 13, wherein the one or more processors are configured to execute the machine-readable instructions further to:
log that the chassis was opened; and
cause, at least in part, the determining whether the opening of the chassis was authorized upon initialization of the system boot and responsive to the logging that the chassis was opened.

17. The computer system of claim 13, wherein the opening of the chassis operates a switch that indicates that the chassis was opened.

18. The computer system of claim 13, wherein the determining whether the opening was authorized includes determining whether a key event occurred.

* * * * *